United States Patent [19]

Nakamura et al.

[11] Patent Number: 4,846,661
[45] Date of Patent: Jul. 11, 1989

[54] ROTARY TYPE INJECTION BLOW MOLDING MACHINE

[75] Inventors: Yoshinori Nakamura; Kouhei Koga; Satoru Kosuge; Yoshihiro Fukunishi, all of Nagano, Japan

[73] Assignee: Nissei ASB Machine Co., Ltd., Japan

[21] Appl. No.: 231,857

[22] PCT Filed: Nov. 5, 1987

[86] PCT No.: PCT/JP87/00855

§ 371 Date: Jul. 5, 1988

§ 102(e) Date: Jul. 5, 1988

[87] PCT Pub. No.: WO88/03472

PCT Pub. Date: May 19, 1988

[30] Foreign Application Priority Data

Nov. 5, 1986 [JP] Japan ............................ 61-263377

[51] Int. Cl.[4] ............................................ B29C 49/06
[52] U.S. Cl. ...................................... 425/522; 264/538; 425/534
[58] Field of Search .................... 425/522, 534, 540; 264/537, 538, 542, 543; 428/35, 36; 215/1 C

[56] References Cited

U.S. PATENT DOCUMENTS

| 4,426,202 | 1/1984 | Krishnakumar et al. | 425/534 |
| 4,457,689 | 7/1984 | Aoki | 264/538 X |
| 4,505,664 | 3/1985 | Craig | 425/534 X |
| 4,648,824 | 3/1987 | Aoki | 264/538 X |
| 4,726,756 | 2/1988 | Aoki | 425/534 X |
| 4,731,011 | 3/1988 | Nakamura et al. | 264/538 X |
| 4,732,557 | 3/1988 | Aoki | 425/522 |
| 4,747,769 | 5/1988 | Nakamura et al. | 264/538 X |

FOREIGN PATENT DOCUMENTS

| 22096 | 7/1978 | Japan | 425/534 |
| 244518 | 12/1985 | Japan . | |
| 287716 | 12/1986 | Japan . | |
| 128708 | 6/1987 | Japan . | |

Primary Examiner—Richard L. Chiesa
Attorney, Agent, or Firm—Ostrolenk, Faber, Gerb & Soffen

[57] ABSTRACT

This invention relates, in a molding machine for continuously carrying out injection molding of a preform and blow molding of a molded article by intermittent rotation of a transfer plate, a rotary type injection molding machine in which a lip retainer plate undersurface of the transfer plate is moved upward and downward to open and close a mold. In this rotary type injection molding machine, the lip retainer plate is mounted on the lower end of a vertical shaft which is upwardly biased by means of a spring member and extends through the transfer plate, the lip retainer plate together with the vertical shaft being movable from the lower surface of the transfer plate to the upper surface of the mold, and a moving clearance at the upper end of the vertical shaft projected on the transfer plate is provided between the upper base plate and the transfer plate.

5 Claims, 4 Drawing Sheets

FIG. 4
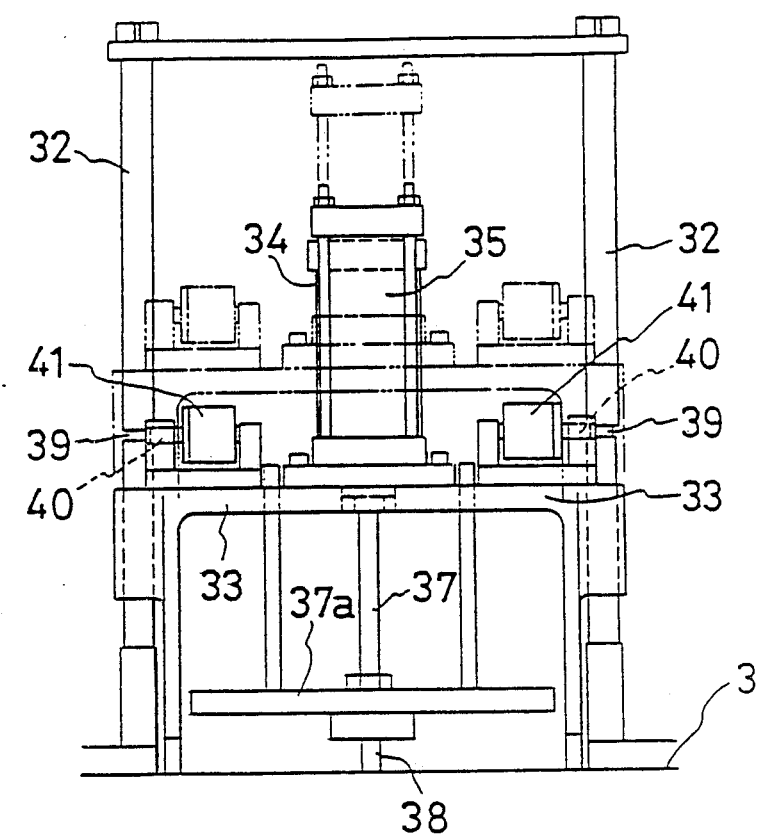
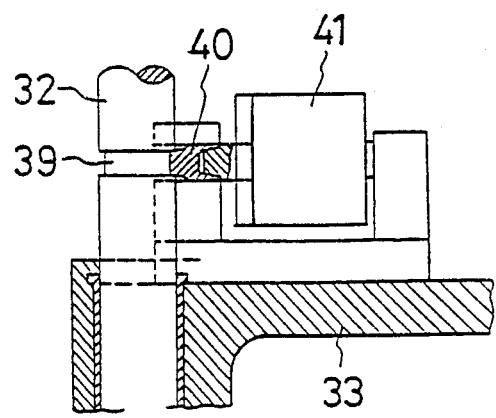
FIG. 5
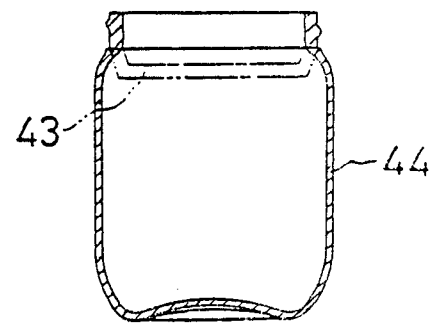
FIG. 6

ROTARY TYPE INJECTION BLOW MOLDING MACHINE

FIELD OF THE ART

This invention relates to a rotary type injection blow molding machine which can continuously carry out, by use of an intermittently rotating transfer plate, the step required to release a molded article blow molded from injection molding of a preform.

BACKGROUND OF THE INVENTION

A molding machine for continuously carrying out the operation from injection molding of a preform to blow molding of a molded article such as a bottle has already been well known from Japanese Patent Publication No. 53-22096.

In a mold device for molding a preform in the aforesaid well known molding machine, an upper base plate upwardly of a machine bed is disposed relative to a lower neck mold, and a cavity mold is moved upward and downward to open and close the mold. Therefore, a nozzle of the injection apparatus has to be disengaged when the mold is opened, which tends to extend the injection molding cycle. A stringiness and a leakage occur in the nozzle depending on the resins.

In view of the above, an attempt has been made so that the cavity mold is fixed onto the machine bed, and conversely the neck mold is moved upward and downward. In this case, however, the neck mold has to be moved upward and downward together with the transfer plate, and therefore, there poses new problems that not only the apparatus becomes complicated in relation to other operating stations but it requires time to rotate the transfer plate immediately after mold-opening to transfer a preform along with the neck mold to the succeeding operating station.

As the means for solving the above-described problems, development has been made of a mold device for molding a preform in which a retaining mold also serving as a molding mold in the outer periphery of an open portion of a preform is moved upward and downward, without moving upward and downward the cavity mold and the transfer plate, to open and close the mold. However, in this apparatus, as disclosed in Japanese Patent Application Laid-Open No. 62-128708, a vertical shaft for supporting the retaining mold upward and downward is mounted downwardly lengthwise on the lower surface of the transfer plate, and therefore, when the blow mold is opened in a horizontal direction and the retaining mold is horizontally moved by the rotation of the transfer plate, the vertical shaft touches the blow mold to render the rotation of the transfer plate difficult. For this reason, it was necessary to make a design so that the blow mold having been installed on the machine bed is moved upward and downward conversely to the cavity mold.

DISCLOSURE OF THE INVENTION

It is an object of this invention to provide a newly designed rotary type injection blow molding machine wherein while a lip mold is mounted on a vertical shaft and vertically movably mounted to the lower surface of the transfer plate, not only a mold for molding a preform but a blow molding need not be installed movably upward and downward on a lower base plate on the machine bed, and even if these molds are at a fixed position of the lower base plate, the vertical shaft comprises no obstacle of the rotation of the transfer plate.

The above-described object is solved by this invention which provides a rotary type injection blow molding machine in which a lower base plate and an upper base plate are disposed up and down parallel to each other on a machine bed, a work space being formed between both the base plates, an annular transfer plate is provided on the underside of said upper base plate, the transfer plate and an intermittently rotating driving device installed in the central portion of the upper base plate are connected by engagement between a rack provided internally of the transfer plate and a pinion on the side of the driving device, lip retainer plates also serving as retaining molds are provided free to open and close at regular intervals on the lower side of the transfer plate while facing to said work space, stop positions of the lip retainer plates being set to operating portions from injection molding of a preform to mold-releasing, and molds or devices are disposed on the upper and lower plates, said machine being arranged so that a plurality of vertical shafts are extended movably upward and downward in a predetermined spaced relation at positions of said transfer plate where the lip retainer plates are installed, upper ends projected from the transfer plate being connected pair by pair to each other, spring members for always upwardly biasing the vertical shafts are disposed between the vertical shafts and the transfer plate, the lip retainer plates being connected to the lower ends of the vertical shafts, said lip retainer plates being provided so as to move to and from injection molds or blow molds provided on the lower surface of the transfer plate and on the upper surface of the lower base plate, and a moving clearance for the upper end of said vertical shaft is provided between the transfer plate and the upper base plate.

In the above-described arrangement, the vertical shaft is biased upwardly by the spring member and the upper end of the vertical shaft projects on the upper surface of the transfer plate but the moving clearance is formed between the transfer plate and the upper base plate. Therefore, the upper end of the vertical shaft passes through the moving clearance and moves together the transfer plate toward the operating portion. As a result, even if the upper end of the vertical shaft which supports the lip retainer plate together with the mold place plate should project above the transfer plate, the rotation of the transfer plate is not at all affected thereby. Because of this, opening and closing of a mold can be effected only by movement of the lip retainer plate upward and downward and therefore it is not necessary to move the cavity mold upward and downward every time the mold is opened and closed and to move the blow mold upward and downward every time the transfer plate is rotated. The injection apparatus can be always placed in nozzle touch with the mold for molding a preform.

BRIEF DESCRIPTION OF THE DRAWINGS

The drawings schematically shows one embodiment of a rotary type injection blow molding machine according to the present invention.

FIG. 4 is a front view of a blowing device;

FIG. 5 is a partial front view of the blowing device; and

FIG. 6 is a longitudinal sectional view of a receptacle with a preform indicated by the dash-dotted contour lines.

BEST MODE FOR WORKING THE INVENTION

Figure 1:
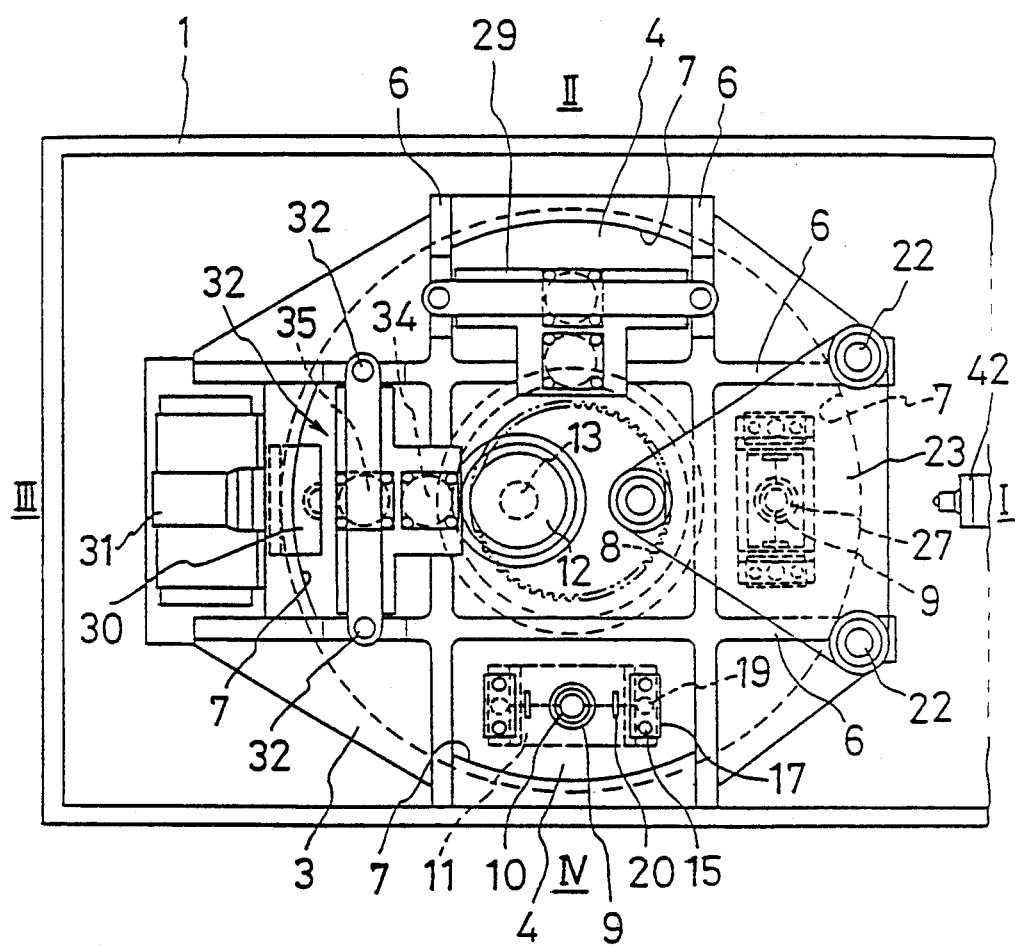
FIG. 1 is a front view.
Figure 2:
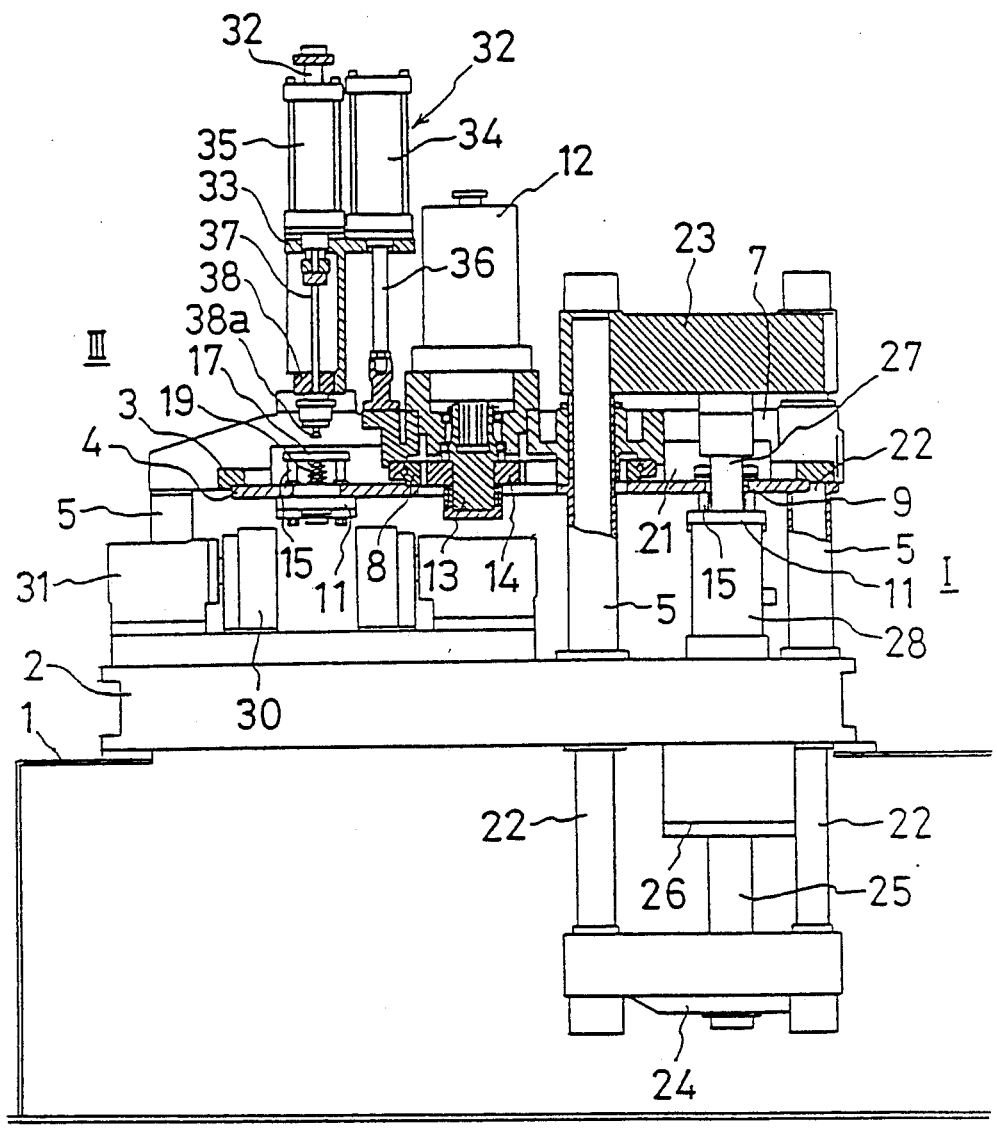
FIG. 2 is a front view with an upper portion longitudinally sectioned.

In the drawings, the reference numeral 1 designates a machine bed, on the upper surface of which is placed and fixed a lower base plate 2. The reference numeral 3 designates an upper base plate, which is provided in parallel above the lower base plate, and a transfer plate 4 is rotatably provided on the underside of the upper base plate 3.

The upper base plate 3 is supported on a plurality of support poles 5, 5 mounted on the periphery of the lower base plate 2, and a work space is formed between both the upper and lower base plates. The transfer plate 4 is held by edge members (not shown in the figure) partially provided in the periphery of the upper base plate 3.

On the upper surface of the upper base plate 3 there are provided a pair of parallel ribs 6, 6 crossed in all directions. A portion between each pair of ribs 6 and 6 except the central portion of the base plate surrounded by the ribs forms holes 7 open to all directions of the base plate.

The transfer plate 4 comprises an annular body having a hole in the center thereof, and a wheel internally formed with a rack 8 is mounted on the hole edge of the annular body. The annular body has holes 9 for receiving a core mold in all directions thereof. The lower surface of the transfer plate 4 where each hole 9 is positioned is a position at which the lip retainer plate is set, and a lip retainer plate 10 also serving as a retaining mold is mounted thereat.

The lip retainer plate 10 is composed of a mold place plate 11 comprising a pair of split plates, a lip mold 10 in the form of a split mold provided over both the split plates, guide members 16 and 16 slidably receiving both side ends of both the mold place plates, and a spring members for biasing the mold place plate 11 in a closing direction, though not shown. The lip retainer plate 10 moves together with the transfer plate 4 and stops at four holes 7, 7 of the upper base plate 3. The rotational movement of the transfer plate 4 is effected by a driving device 12 (for example, a 90-degree rotation hydraulic type actuator or an electric motor) mounted in the central portion of the upper surface of the upper base plate 3 for rotation in the range of a fixed angle. A driving shaft 13 of the driving device 12 extends through a hole bored in the base plate and projects into a central hole of the transfer plate 4 positioned underside of the base plate, and a pinion 14 connected to the driving shaft 13 and said rack 8 are engaged with each other and the transfer plate 4 can be intermittently rotated through a given angle by the driving device 12.

In the portion of the transfer plate 4 where the hole is bored, vertical shafts 15 are extended pair by pair in parallel to each other in the circumferential direction spaced from the hole 9, and a lip mold 10a together with an internally and externally mold place plate 11 are mounted through a guide member 16 on the lower end of the vertical shaft 15.

The vertical shafts 15 are integrally connected pair by pair by plate-like connecting members 17 provided over the upper ends, and a spring member 19 is compressed and received into a receiving tube 18 provided in the transfer plate 4 on the lower side of the connecting member 17. The upper end of the spring member 19 comes into contact with the connecting member 17 to always upwardly bias the pair of vertical shafts 15 through the connecting member 17 to urge the mold place plate 11 mounted to the lower end of the vertical shaft 15 together with the lip mold 10a against the lower surface of the transfer plate 4. The reference numeral 20 designates a hole for receiving a mold-opening wedge bored in the transfer plate 4 and the mold place plate 11.

Between the transfer plate 4 and the upper base plate 3 is provided a clearance 21 through which moves the upper end of the vertical shaft 15 leaving the peripheral portion of the machine bed. Even if the vertical shaft 15 projected on the transfer plate, the intermittent rotation of the transfer plate 4 can be effected without trouble by the provision of the clearance 21.

In the rotary type molding machine having the structure as described above, the four holes 7, 7 of the upper base plate 3 are used as the operating portions, i.e., a preform-molding operation portion, a temperature-control operating portion, a blow-molding operation portion and a mold-releasing operating portion, on which portions various devices and molds can be disposed.

The preform-molding operating portion I is composed of three tie bars 22 which vertically movably extend through the upper and lower base plates 2 and 3 and are positioned internally and externally of the transfer plate 4, clamping plates 23 mounted on the upper ends of the tie bars 22 and connecting plates 24 at the lower ends of the tie bars, and clamping cylinders 26 provided underside of the lower base plate 2 having a clamping rod 25 connected to the connecting plate 24, and a core mold 27 is provided downwardly on the lower surface of the clamping plate 23. A cavity mold 28 for a preform is placed and fixed to the lower base plate 2.

In the temperature-control operating portion II adjacent to the preform-molding operating portion I, a temperature-control mold for a preform is provided movably upward and downward with respect to the lip retainer plate 10, not shown, and a core inserting device 29 is disposed on the upper base plate 3.

In the blow-molding operating portion III, a blow mold 30 is placed free to open and close internally and externally on the lower base plate 2 together with a hydraulic cylinder 31, and a core inserting device 32 is stood on the upper base plate 3.

The core inserting device 32 is composed, as shown in FIG. 4, of a seat 33 vertically movably held on a pair of support poles 32, air cylinders 34 and 35 downwardly placed and fixed to the seat 33, and a blow core 38 connected to a plate 37a at the end of a rod 36 for connecting one air cylinder 34 to the upper base plate 3 and a rod 37 of the other air cylinder 35.

Cross grooves 39 are provided in intermediate portions of the support poles 32, respectively, and semi-circular stoppers 40 and 40 are fitted in the ends provided on the seat by air cylinders 41 and 41 to prevent the seat 33 from being moved due to reaction during blow molding (see FIG. 5).

It is noted that this operating portion can be utilized as annealing, lavelling and cleaning operating portions.

In the mold-releasing operating portion IV positioned adjacent to the blow molding operation portion III, though not shown, a mold-releasing device in the form of an air cylinder or a hydraulic cylinder, which is downwardly provided with a pair of wedges fitted from the underside into insert holes 20 and 20 provided in the transfer plate 4 and the mold place plate 11 to internally and externally open the mold place plate 11 and the lip mold 10a, is provided to extend through the lower base plate 2.

Figure 3:
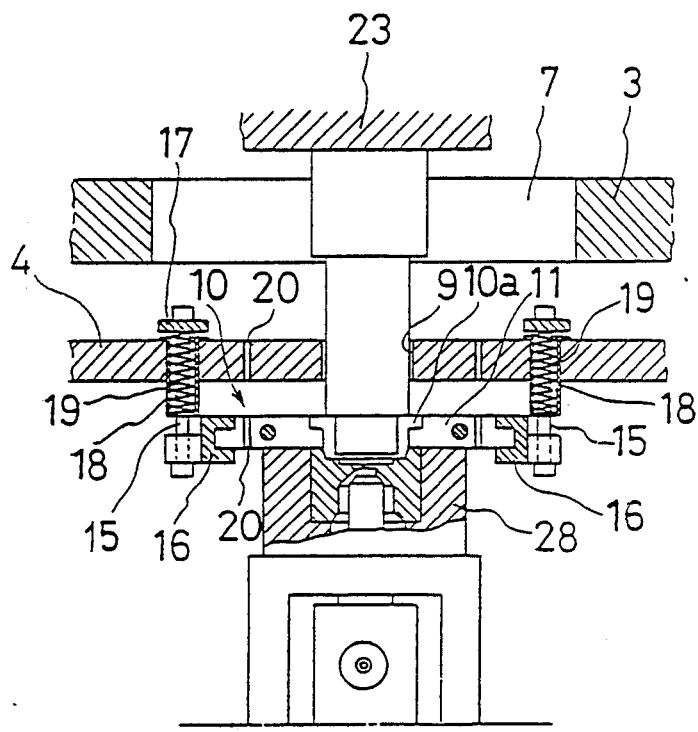
FIG. 3 is a partial longitudinal sectional view of an injection molding operating portion.

In the rotary molding machine, in the preform-molding operation portion I wherein when the hole 9 is positioned at the hole portion 7 of the upper base plate in the state where the transfer plate 4 stops, the core mold 27 is moved together with the tie bar 22 in a direction of opening the mold by the clamping cylinder 26 underside of the lower base plate 2, the core mold 27 extends through the hole 9 and reaches the lip retainer plate 10, as shown in FIG. 3, and the mold surface at the end thereof is fitted into the lip retainer plate 10a and a shoulder comes into contact with and presses the upper surface of the lip retainer plate 10a.

Thereby the lip retainer plate 10 together with the vertical shaft 15 is moved downwardly against the spring member 19 and comes into contact with the upper surface of the cavity mold 28 whereby the cavity mold 28 and the lip retainer plate 10 and the core mold 27 are closed.

After the closure of the molds are described, molten resin is poured from the injection apparatus 42 into the cavity to mold a flat preform 43 (see FIG. 6), after which the mold is opened by the clamping cylinder 26 and when the core mold 27 is moved upward, the lip retainer plate 10 together with the vertical shaft 15 is moved upward under the spring pressure. At this time, the lip retainer plate 10a returns to the lower surface of the transfer plate 4 while contacting with the shoulder of the core mold 27. Further, the core mold 27 is moved out of the lip mold 10a after the lip retainer plate 10 has contacted with the lower surface of the transfer plate, and the core mold 27 returns to its original position upwardly of the upper base plate 3. As the result, a preform 43 as shown by the dash-dotted contour lines in FIG. 6 remains on the lip retainer plate 10.

The preform 43 in its state is transferred together with the lip retainer plate 10 by the rotation of the transfer plate 3 to the blow-molding operation portion III via the temperature-control operating portion II.

In the blow-molding operating portion III, when the hole 9 of the transfer plate 4 assumes a position of the hole portion 7, the air cylinder 34 is first operated to move down the seat 33 together with the other air cylinder 35 to move down the blow core 38 having an end shape similar to the core mold 27. Thereby, likewise the case of the core mold 27, the lip retainer plate 10 together with the mold place plate 11 is urged against the upper surface of the closed blow mold 31 against the spring member 19. At this position, the seat 33 is fixed by the fitting between the stopper 40 and the cross groove 39.

Subsequently, the air cylinder 35 is operated, an elongate rod 37 in the center of the blow core is extended and the preform 43 is molded into a receptacle 44 as shown in FIG. 6 by the air blowing.

Returning of the lip retainer plate 10 to the under surface of the transfer plate after molding is automatically carried out by the spring pressure of the spring member 19 with the return of the opened blow core 38, and by said return, the receptacle is also held at its opening portion by the lip retainer plate 10 and transferred to the transfer plate. Then, the receptacle is held by the lip retainer plate 10 by the rotation of the transfer plate 4 and transferred to the succeeding mold-releasing operating portion 11.

INDUSTRIAL APPLICABILITY

As described above, according to the present invention, the lip retainer plate together with the mold place plate is connected to the plurality of vertical shafts which extend through the transfer plate and always upwardly biased by means of the spring member, the lip retainer plate being provided so as to move to and from the transfer plate, the moving clearance for the vertical shafts is provided between the transfer plate and the upper base plate, and both the cavity mold for the preform and the blow mold are installed on the upper surface of the lower base plate whereby the mold opening and closing can be effected merely by vertically moving the lip retainer plate. Therefore, it is not necessary to move up and down the cavity mold every time the mold is opened and closed and move up and down the blow mold every time the transfer plate is rotated, whereby the injection apparatus can be always placed in nozzle touch the enhance the molding cycle. Therefore, the effect thereof is great and the apparatus can be effectively and widely utilized in terms of industry.

What is claimed is:

1. A rotary type injection blow molding machine in which a lower base plate and an upper base plate are disposed spaced and parallel to each other on a machine bed, a work space being formed between both the base plates, an annular transfer plate is provided on the underside of said upper base plate, the transfer plate and an intermittently rotating driving device installed in the central portion of the upper base plate are connected by engagement between a rack provided internally of the transfer plate and a pinion on the side of the driving device, lip retainer plates also serving as retaining molds are provided free to open and close at regular intervals on the lower side of the transfer plate while facing to said work space, stop positions of the lip retainer plates being set to operating portions from injection molding of a preform to mold-releasing, and molds or devices required for molding are disposed on the upper and lower plates, plurality of vertical shafts mounted on said transfer plate, said machine being arranged so that said plurality of vertical shafts are extended movably upward and downward in a predetermined spaced relation at positions of said transfer plate where the lip retainer plates are installed, upper ends projected from the transfer plate being connected pair by pair to each other, spring members for always upwardly biasing the vertical shafts are disposed between the vertical shafts and the transfer plate, the lip retainer plates being connected to the lower ends of the vertical shafts, said lip retainer plates being provided so as to move to and from injection molds or blow molds provided on the lower surface of the transfer plate and on the upper surface of the lower base plate, and a moving clearance for the upper end of said vertical shaft is provided between the transfer plate and the upper base plate.

2. A rotary type injection blow molding machine according to claim 1, wherein upper said base plate is strengthened by four ribs crossed in the central portion, hole portions open in all directions of the upper base plate are positioned between each pair of ribs except the central portion, said devices required for molding are provided on said upper base plate, a driving device which is rotated in the range of a fixed angle is provided in the central portion of the base plate surrounded by the four ribs, a driving shaft is positioned in the hole portion in the central portion of said transfer plate rotatably provided underside of the base plate, and the pinion connected to said driving shaft and said rack internally of the transfer plate are brought into engagement with each other.

3. A rotary type injection blow molding machine according to claim 1, wherein said driving device comprises a hydraulic actuator which is rotated at a fixed angle.

4. A rotary type injection blow molding machine according to claim 1, wherein said driving device comprises an electric motor.

5. A rotary type injection blow molding machine according to claim 1, wherein a core feed device for orientation blow molding is provided on the upper base plate of the blow molding operating portion, said device comprising a seat held movably up and down on a pair of support poles provided on the upper base plate, a first air cylinder placed and fixed downwardly to said seat, a rod for connecting a second air cylinder and the upper base plate, and a blow core connected to a plate at the end of the rod of the first air cylinder.

* * * * *